(12) United States Patent
Moon et al.

(10) Patent No.: US 7,268,349 B2
(45) Date of Patent: Sep. 11, 2007

(54) INFRARED ABSORPTION LAYER STRUCTURE AND ITS FORMATION METHOD, AND AN UNCOOLED INFRARED DETECTOR USING THIS STRUCTURE

(75) Inventors: Sung Moon, Namnyangju-shi (KR);
Hyun-Joon Shin, Seoul (KR);
Yong-Hee Han, Seoul (KR)

(73) Assignee: Korea Advanced Institute of Science and Technology, Seoul (KR)

( * ) Notice: Subject to any disclaimer, the term of this patent is extended or adjusted under 35 U.S.C. 154(b) by 0 days.

(21) Appl. No.: 10/953,696

(22) Filed: Sep. 29, 2004

(65) Prior Publication Data

US 2006/0060784 A1    Mar. 23, 2006

(30) Foreign Application Priority Data

Sep. 17, 2004    (KR) .................. 10-2004-0074601

(51) Int. Cl.
*G01J 5/00*     (2006.01)
(52) U.S. Cl. ............... 250/338.1; 250/338.4; 250/370.08
(58) Field of Classification Search ............ 250/338.1, 250/338.4, 370.08
See application file for complete search history.

(56) References Cited

U.S. PATENT DOCUMENTS

| | | | | |
|---|---|---|---|---|
| 5,369,280 A | * | 11/1994 | Liddiard | 250/370.08 |
| 5,831,266 A | * | 11/1998 | Jerominek et al. | 250/338.4 |
| 6,339,220 B1 | * | 1/2002 | Oda | 250/338.1 |
| 6,777,681 B1 | * | 8/2004 | Schimert et al. | 250/338.4 |
| 2001/0015810 A1 | * | 8/2001 | Hara et al. | 356/519 |

FOREIGN PATENT DOCUMENTS

JP     2002-54995     2/2002

* cited by examiner

*Primary Examiner*—Renee Luebke
*Assistant Examiner*—Mary Zettl
(74) *Attorney, Agent, or Firm*—Harness, Dickey & Pierce, PLC

(57) ABSTRACT

The present invention relates to uncooled infrared detector with infrared absorption structure in which the supporting layer, detection layer, protecting layer, and dielectric layer construct $\lambda/4$ resonating absorbtion structure as a single body. In order to enhance the characteristic of uncooled infrared detector, it is essential for the infrared absorption layer to absorb incident infrared with high efficiency. The present invention is characterized in that the infrared detector with unified absorption layer includes an infrared detection film, a device protecting layer, a supporting layer for thermally isolated structure, and a dielectric layer, etc. in its absorption structure. Due to this characteristic, highly efficient infrared absorption is possible with much less thermal mass than the absorption layer for the structure of existing metal/dielectric/metal structure and regardless of the distortion of floating structure caused by fabrication fault rather than air cavity $\lambda/4$ structure.

16 Claims, 3 Drawing Sheets

INFRARED ABSORPTION LAYER STRUCTURE AND ITS FORMATION METHOD, AND AN UNCOOLED INFRARED DETECTOR USING THIS STRUCTURE

BACKGROUND OF THE INVENTION

1. Field of the Invention

The present invention relates to the structure of an infrared detector with a unified absorption layer having low thermal mass and highly effective infrared absorbance and thus being capable of improving the characteristics of an uncooled infrared detector, and an uncooled infrared detector using this structure of an infrared detector with a unified absorption layer.

2. Description of the Related Art

The pyroelectric, bolometer, and thermopile being applied for uncooled infrared detector are a thermal detector, which detects infrared by transforming the change of physical characteristics in a material by thermal energy of incident infrared to electric signal. Therefore, for the purpose of fabricating a highly sensitive infrared detector, it is essential to make the physical characteristic change of the detecting material be bigger by increasing the absorbance of incident infrared.

Infrared absorption methods developed until now are divided into the method using infrared absorption materials such as a gold black and a platinum black, and the method absorbing infrared by resonating infrared using $\lambda/4$ optical depth.

While the method using a metal black can obtain high infrared absorbance over 90%, it is difficult to apply to FPA (focal plane array) for the real device and infrared imaging device by the patterning problem (even though the thickness of an absorption layer is from several μm to tens of μm, it is too thick and the metal blacks have a poor adhesion property, thereby the patterning problem can be occurred due to the characteristics of the material).

One of the methods using $\lambda/4$ optical depth absorbs infrared by forming a $\lambda/4$ resonating absorption structure of semi-transparent film/dielectric (generally polyimide)/reflecting film structure on the top side of an infrared detection part, as described in FIG. 2 and thus it has been generally applied to the infrared device fabricated by the bulk micromachining method. The methods using silicon, or germanium with high refractive index as dielectric material are disclosed in JP 13-116616 A, JP 13-153722 A, and JP 14-054995 A. These absorption layer structures have infrared absorbance over 90% similar to that of metal black absorption layer. However, in case of using polyimide, the thickness for polyimide is around 1.6 μm and thus it is thick. The specific heat capacity of polyimide is about 1100 J/K/kg and thus it is rather high and it causes thermal mass to be much increased. This thermal mass increment acts as the factor hindering the characteristic improvement of infrared device. Though the use of silicon or germanium with high refractive index can also reduce the thickness than the use of polyimide, the increment of thermal mass caused by the use of silicon or germanium is needed to be minimized.

The other method using $\lambda/4$ optical depth is to absorb infrared forming $\lambda/4$ air cavity resonating structure by making the floating height be 2.5 μm($\lambda/4$ of 10 μm wavelength) using surface micromachining method as shown in FIG. 4. Since this method absorbs infrared using floating structure itself without special absorption layer, it can improve infrared absorbance without any thermal mass increment. However, it can cause the decrement of infrared absorbance because of the distortion of floating structure frequently occurred after the removal of a sacrificial layer in surface micromachining, and this method greatly depends on the reproducibility and uniformity of device fabrication process, and can produce uniformity problem of overall device due to the characteristic degradation of each individual pixel when it is applied to FPA.

The present invention is for resolving the above existing technical problems, and the objective of the present invention is to provide a novel absorber structure with high infrared absorbance over 90% as well as resolve the problem of high increment of thermal mass which is a problem in metal/dielectric/metal absorber structure used as an infrared absorption layer in the device fabricated with existing developed bulk micromachining method.

The other objective of the present invention is to provide an infrared device with a highly effective infrared absorber for a new structure of uncooled infrared detector which is capable of resolving the problem of the infrared absorbance decrement due to the distortion of floating structure occurred in $\lambda/4$ air cavity absorber structure fabricated by surface micromachining method.

SUMMARY OF THE INVENTION

The following effects can be obtained by applying the absorption layer structure of the present invention to uncooled infrared detector.

Firstly, the thickness of overall absorption layer and the increment of thermal mass can be minimized by using the structure unifying a supporting layer, an infrared detecting layer, a protecting layer, and a dielectric layer in the absorption structure.

Secondly, the characteristic degradation by the declination of infrared absorbance caused by the distortion of the floating structure in the existing $\lambda/4$ air cavity is not occurred.

Thirdly, the absorption layer of the present invention takes advantage of applying to all the device fabrication methods like a bulk micromachining method or a surface micromachining method. Moreover, the fabrication of uncooled infrared detector with enhanced detectivity is possible by utilizing the above absorption layer and absorption layer structure to the uncooled infrared detector.

DESCRIPTION OF THE NUMERALS ON THE MAIN PARTS OF THE DRAWINGS

Figure 1:
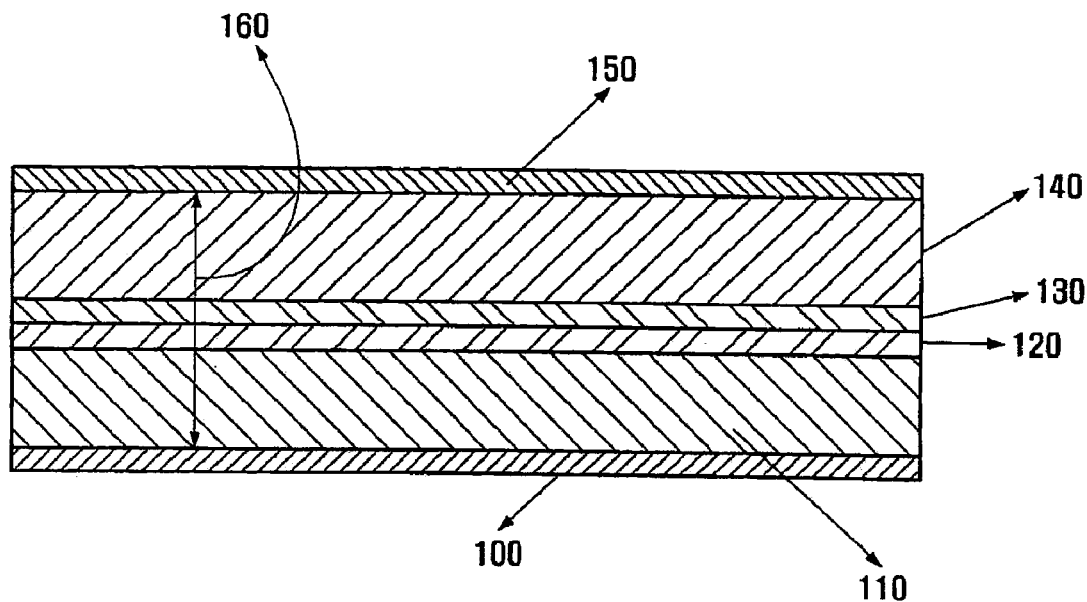
FIG. 1 is a brief conceptual view illustrating a $\lambda/4$ absorption structure in which an absorption layer, a detecting layer, and a supporting layer are unified in accordance with the present invention.

100: a reflecting layer
110: a supporting layer
120: an active layer
130: a protecting layer
140: a dielectric layer
150: a semi-transparent film
160: a λ/4 structure

DETAILED DESCRIPTION OF THE EMBODIMENTS

Hereinafter, referring to appended drawings, the structures and operation principles of the present invention are described in detail.

The structure for the absorbing layer of the present invention is characterized in that a reflecting layer (100), a supporting layer (110) for thermally isolated structure, a detecting layer (120) for infrared detection, a protecting layer (130) for protection of device are unified with a λ/4 structure (160) together with a dielectric layer (140) as shown in FIG. 1.

The formation method of the absorber structure is as follows.

At first, a metal reflecting layer (100) for infrared reflection is formed, and then a supporting layer (110) for thermal isolation structure is deposited. At this time, silicon nitride film, oxide film, or oxide nitride film(SiOxNy) can be used as a supporting layer (110), and a protecting film can be formed before coating a reflecting layer in order to preventing the deterioration of a metal reflecting layer capable of being occurred at bulk etching process for thermal isolation structure or sacrificial layer removal process.

Next, a thin metal film for metal contact is deposited, patterning is performed, an infrared detecting layer (120) is deposited, and then patterning is performed. At this time, the materials such as pyroelectric, bolometer, and thermopile can be used as an infrared detecting layer (120) being deposited, and the patterning process can be proceeded after depositing a thin film for protecting the degradation of characteristic features at the patterning process of an infrared detecting layer (120).

Subsequently, the patterning is performed with a supporting layer (100) after a protecting layer (130) is deposited for device protection, and the patterning is performed with a dielectric layer (140) through a metal semi-transparent layer (150) deposition after a dielectric layer (140) deposition. At this time, polycrystalline silicon deposited with LPCVD, PECVD, etc. or amorphous silicon capable of depositing with sputtering, low temperature PECVD, etc. can be used as the deposited dielectric layer (140) under the consideration of process temperature at which infrared device is fabricated, and a very thin protection film can be formed on a metal semi-transparent film for protecting the deterioration of a metal semi-transparent film capable of occurring at the process of bulk etching for thermal isolation structure or sacrificial layer removal process.

As such, it is possible to fabricate uncooled infrared detector having thermal isolation structure and high infrared absorbance through bulk etching for the case of using bulk micromachined method according to device fabrication process after forming absorption structure in which a supporting layer (110), a detecting layer (120), a protecting layer (130), and a dielectric layer (140) are unified, and through the sacrificial layer removal for the case of using surface micromachined method.

Figure 3:
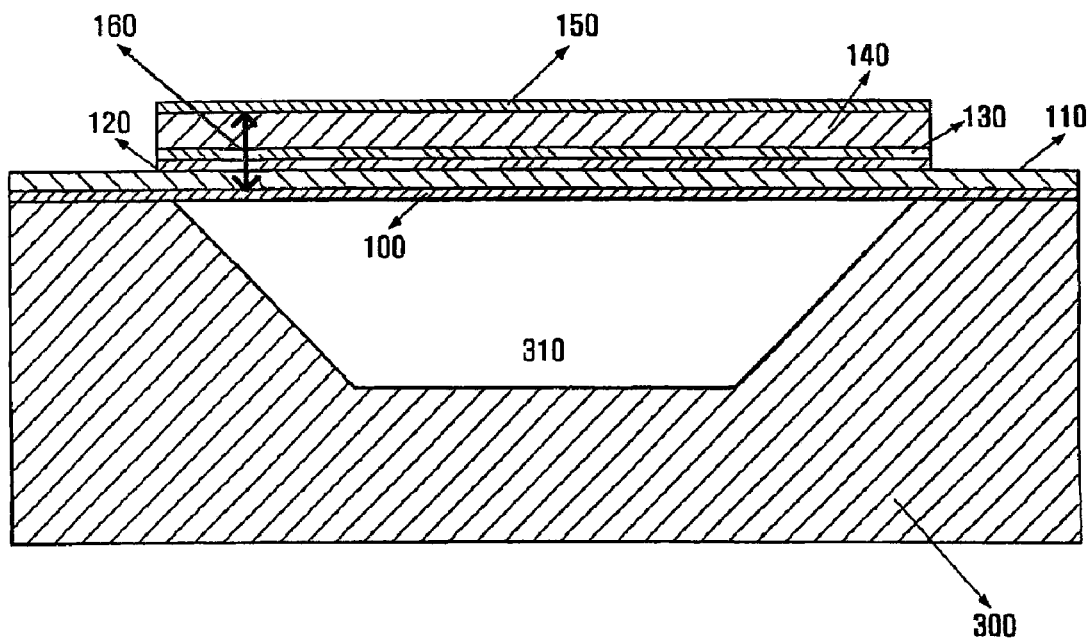
FIG. 3 is a stereoscopic view of the structure for bulk micromachined infrared device with unified infrared absorption structure including silicon, and so low thermal mass.

FIG. 3 is a stereoscopic view in which this unified absorbing structure is applied to an uncooled infrared detector fabricated by bulk micromachined method.

As illustrated in FIG. 3, the uncooled infrared detector in accordance with the present invention is formed with the sequence of a reflecting layer (100), a supporting layer (110), a detecting layer (120), a protecting layer (130), a dielectric layer (140), and a semi-transparent layer (140) on silicon (300), and the infrared absorbing structure of the present invention is formed with the λ/4 structure unifying the above supporting layer (110), detecting layer (120), protecting layer (130), and dielectric layer (140).

Figure 2:
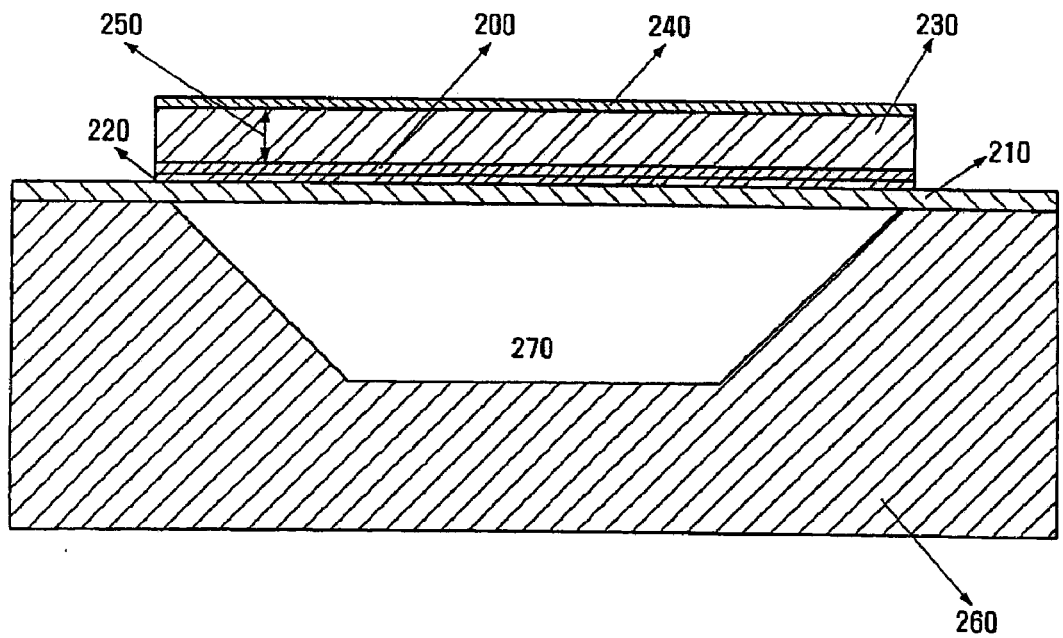
FIG. 2 is a stereoscopic view of the structure for bulk micromachined infrared device with existing infrared absorption layer using polyimide.

With the use of the structure in which a supporting layer, a detecting layer, and a protecting layer are included in the absorbing structure as shown in the above present invention, the total layer thickness of infrared detector can be greatly reduced than the prior structure shown in FIG. 2 and the increment of thermal mass by the absorbing layer can be minimized.

Here, the silicon used in a dielectric layer (140) is characterized in that the thickness is less than 0.7 μm and thermal mass is as low as 678 J/K/kg.

Figure 4:
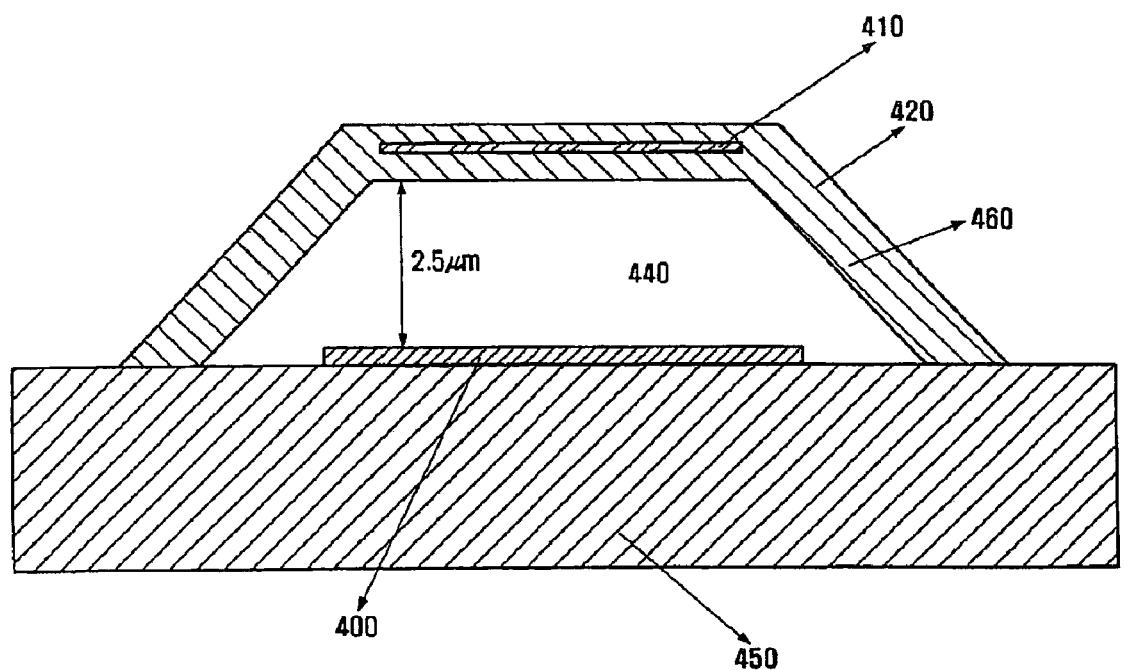
FIG. 4 is a stereoscopic view of the structure for surface micromachined infrared device with $\lambda/4$ air cavity absorption layer structure.

FIG. 4 shows an existing λ/4, 2.5 μm air cavity absorbing structure fabricated by surface micromachined method.

As illustrated in FIG. 4, a reflecting layer (400) is formed on the silicon substrate (450), the thermal isolation structure and λ/4 air cavity (440) in which its maximum height is 2.5 μm from the above reflection layer (400) are formed, and a protecting layer (420) is formed by surrounding the λ/4 air cavity (440) and a detecting layer (410) is formed in a supporting layer (420).

Figure 5:
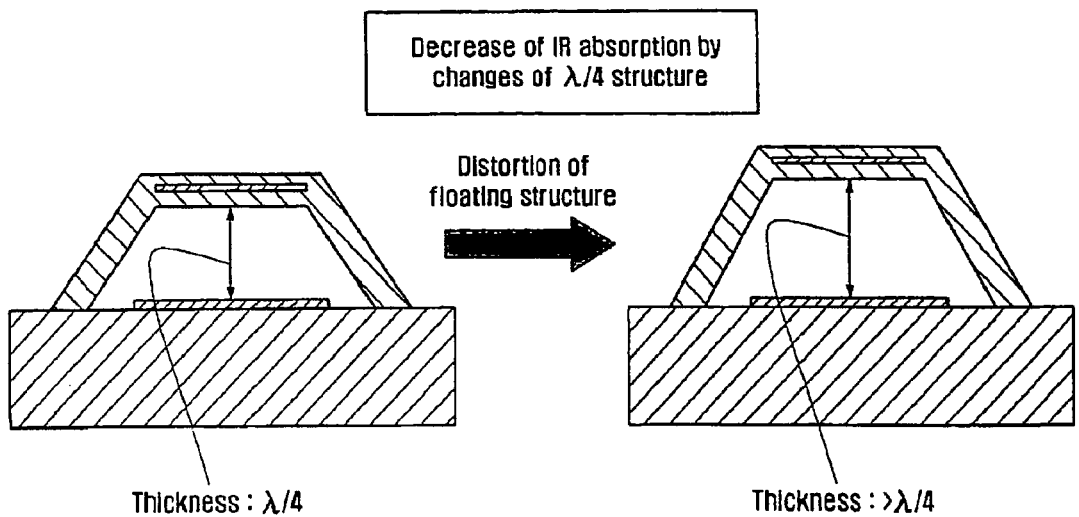
FIG. 5 is a stereoscopic view showing the deformation of $\lambda/4$ air cavity absorption layer structure caused by the distortion of floating structure capable of coming into existence after the elimination of a sacrificial layer.

FIG. 5 shows that the structural distortion capable of being occurred at the time of sacrificial layer removal in the absorbing structure in FIG. 4 can cause infrared absorbance to be reduced.

Figure 6:
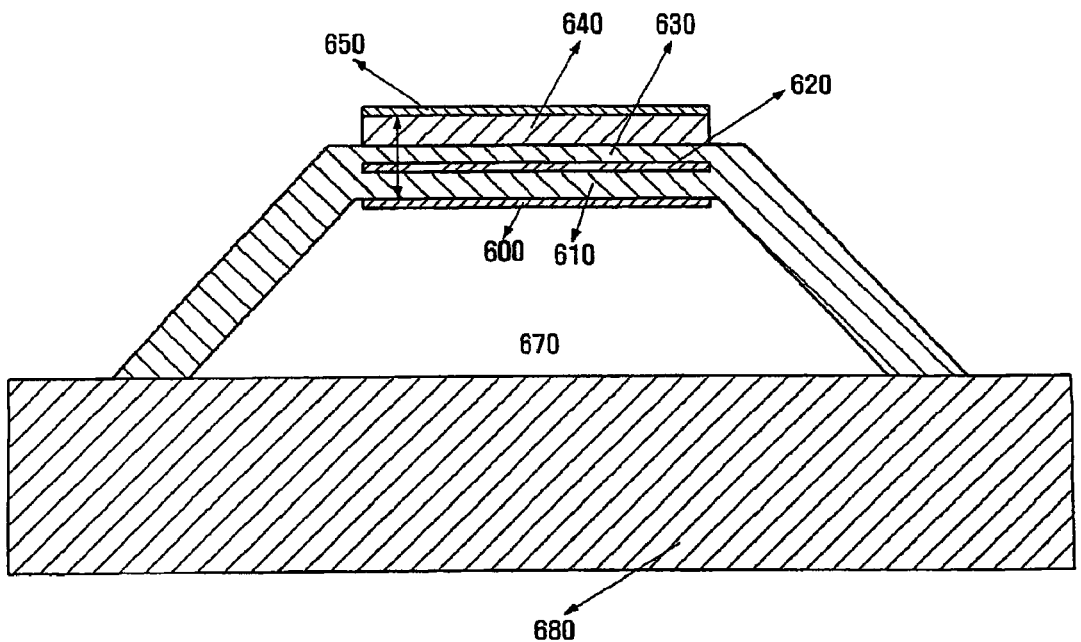
FIG. 6 is a stereoscopic view of the surface micromachined infrared device with unified infrared absorption structure, showing highly effective absorption rate regardless of the distortion of floating structure after the elimination of a sacrificial layer, and including silicon.

FIG. 6 is a stereoscopic view that the unified absorbing structure of the present invention is applied to an uncooled infrared detector fabricated by surface micromachined method.

As illustrated in FIG. 6, the uncooled infrared detector fabricated by surface micromachined method of the present invention is constructed with a silicon substrate (680), a thermal isolation air cavity (670) on the above silicon substrate (680), a reflecting layer formed on thermal isolation air cavity against the above silicon substrate (680), a supporting layer (610) formed on the above reflecting layer (600), a detecting layer (620) formed on the above supporting layer (610), a protecting layer (630) formed on the above detecting layer (620), a dielectric layer (640) formed on the above protecting layer (630), and a semi-transparent film (650) formed on the above dielectric layer (640). The infrared absorption structure of the present invention is formed with the λ/4 structure unifying the above supporting layer (610), a detecting layer (620), a protecting layer (630), and a dielectric layer (640).

As such, since the absorption structure of the present invention absorbs infrared regardless of the height of air cavity, the device with high infrared absorption, high reproducibility, and good uniformity for applying to FPA regardless of process variations can be fabricated. In this structure, air cavity only performs the function of thermal isolation. Since those having ordinary knowledge and skill in the art of the present invention will recognize additional modifications and applications within the scope thereof, the present invention is not limited to the embodiments and drawings described above.

The entire content of Priority Document No. 10-2004-0074601 is incorporated herein by reference.

What is claimed is:

1. An infrared absorption layer structure, characterized in that said absorption layer comprises:
    a supporting layer,
    a reflection layer formed beneath said supporting layer,
    a detecting layer formed on said supporting layer,
    a protecting layer for protecting a device formed on said detecting layer, and
    an additional dielectric layer formed on said protecting layer,
    wherein said supporting layer, detecting layer, protecting layer and additional dielectric layer are unified to form a $\lambda/4$ structure having an optical depth of $\lambda/4$ of infrared radiation.

2. An infrared absorption layer structure as claimed in claim 1, characterized in that said additional dielectric layer is formed of Silicon, and said Silicon is amorphous silicon in low temperature fabrication process.

3. An infrared absorption layer structure as claimed in claim 2, characterized in that the reflection layer is an infrared reflection layer formed beneath said supporting layer, and a semi-transparent film for effective absorption is formed on said additional dielectric layer.

4. An infrared absorption layer structure as claimed in claim 3, characterized in that a thin protecting film is formed on said semi-transparent layer and beneath said reflecting layer respectively.

5. An uncooled infrared device including the infrared absorption layer as claimed in claim 2, characterized in that an infrared reflection layer is formed beneath said supporting layer, and a semi-transparent film for effective absorption is formed on said additional dielectric layer.

6. An uncooled infrared device including the infrared absorption layer as claimed in claim 5, characterized in that a thin protecting film is formed on said semi-transparent layer and beneath said reflecting layer respectively.

7. An infrared absorption layer structure as claimed in claim 1, characterized in that said reflection layer is an infrared reflection layer formed beneath said supporting layer, and a semi-transparent film for effective absorption is formed on said additional dielectric layer.

8. An infrared absorption layer structure as claimed in claim 7, characterized in that the protecting layer is formed on said semi-transparent film and beneath said infrared reflection layer.

9. An uncooled infrared device including the infrared absorption layer, characterized in that said absorption layer comprises:
    a supporting layer,
    a reflection layer formed beneath said supporting layer,
    a detecting layer formed on said supporting layer,
    a protecting layer for protecting the device formed on said detecting layer, and
    an additional dielectric layer formed on said protecting layer, wherein
    said supporting layer, detecting layer, protecting layer and additional dielectric layer are unified to form a $\lambda/4$ structure having an optical depth of $\lambda/4$ of infrared radiation.

10. An uncooled infrared device including the infrared absorption layer as claimed in claim 9, characterized in that the reflection layer is an infrared reflection layer formed beneath said supporting layer, and a semi-transparent film for effective absorption is formed on said additional dielectric layer.

11. An uncooled infrared device including the infrared absorption layer as claimed in claim 10, characterized in that the protecting layer is formed on said semi-transparent layer and beneath said reflecting layer respectively.

12. A method of forming an infrared absorption layer structure, characterized in that said method includes:
    a step of forming a metal reflecting layer and performing patterning on the metal reflecting layer,
    a step of depositing a supporting layer for a thermal isolation structure on said reflecting layer and performing patterning on the supporting layer, the reflecting layer formed beneath said supporting layer for infrared reflection,
    a step of forming a metal thin film for metal contact and performing patterning on the metal thin film,
    a step of forming an infrared detecting layer, and performing patterning on the infrared detecting layer,
    a step of forming a protecting layer for protecting the detecting layer on said infrared detecting layer, and performing patterning on the protecting layer,
    a step of forming an additional dielectric layer,
    a step of forming a metal semi-transparent film for effective absorption on said additional dielectric layer, and
    said supporting layer, detecting layer, protecting layer and additional dielectric layer are made to be unified to form a $\lambda/4$ structure having a $\lambda/4$ optical depth of thickness.

13. A method of forming an infrared absorption layer structure as claimed in claim 12, characterized in that said additional dielectric layer is formed of Silicon, and amorphous silicon is used as said Silicon for low temperature infrared device fabrication process.

14. A method of forming an infrared absorption layer structure as claimed in claim 12, characterized in that said method further includes a step of forming a thin protecting film for protecting against deterioration of said metal semi-transparent film which occurs in bulk etching or sacrificial layer removal process when air cavity for thermal isolation structure is fabricated, wherein said thin protecting film is a low stress silicon nitride formed at low temperature and the thickness is 10 nm-50 nm.

15. A method of forming an infrared absorption layer structure as claimed in claim 12, characterized in that said method further includes a step of forming a protecting film before a reflection film is deposited for protecting against deterioration of a metal reflecting film which occurs in bulk etching process used to fabricate air cavity for thermal isolation structure or sacrificial layer removal process, wherein said thin protecting film is a low stress silicon nitride formed at low temperature and the thickness is 50 nm-100 nm.

16. A method of forming an infrared absorption layer structure as claimed in claim 12, characterized in that a pyroelectric, bolometer, or thermopile material is used as said infrared detecting layer.

* * * * *

UNITED STATES PATENT AND TRADEMARK OFFICE
CERTIFICATE OF CORRECTION

| | |
|---|---|
| PATENT NO. | : 7,268,349 B2 |
| APPLICATION NO. | : 10/953696 |
| DATED | : September 11, 2007 |
| INVENTOR(S) | : Sung Moon et al. |

Page 1 of 1

It is certified that error appears in the above-identified patent and that said Letters Patent is hereby corrected as shown below:

On the Title Page, Item (73)
  In the Assignee Name:  "Korea Advanced Institute of Science and Technology" should be --Korea Institute of Science and Technology--

Signed and Sealed this

Fourth Day of November, 2008

JON W. DUDAS
*Director of the United States Patent and Trademark Office*